March 26, 1963     E. C. RHODES ETAL     3,083,109
COMPOSITE METAL REFRACTORY
Original Filed Feb. 20, 1958
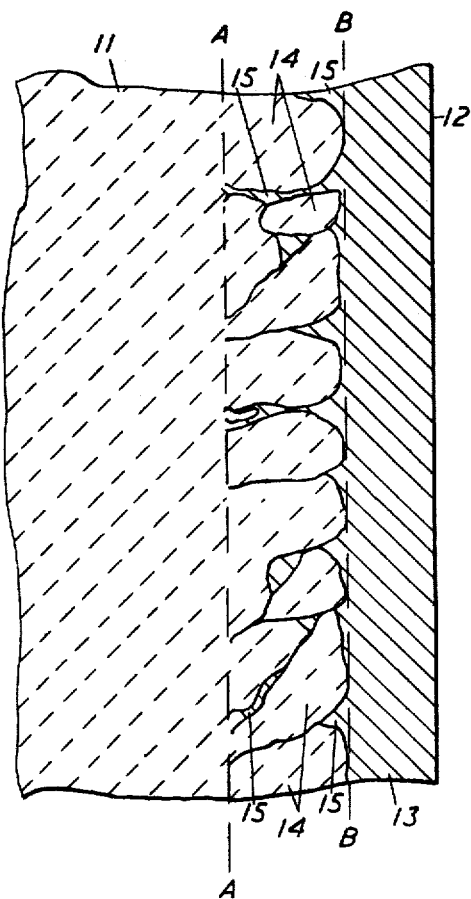
EDWIN C. RHODES
PETER E. GAINSBURY
Inventors
By
Attorney United States Patent Office 3,083,109
Patented Mar. 26, 1963

3,083,109
COMPOSITE METAL REFRACTORY
Edwin Clements Rhodes, Kingston Hill, Surrey, and Peter Edward Gainsbury, Ruislip, England, assignors to The International Nickel Company, Inc., New York, N.Y., a corporation of Delaware
Original application Feb. 20, 1958, Ser. No. 716,402. Divided and this application Feb. 12, 1960, Ser. No. 8,400
Claims priority, application Great Britain Feb. 27, 1957
8 Claims. (Cl. 106—1)

The present invention relates to composite metal refractory products and, more particularly, to composite refractory platinum metal products.

It is well known that in the manufacture of glass and other vitreous materials (such as enamel) by melting, difficulty is caused by the tendency of the melt to attack the refractory vessels and apparatus used especially in channels and orifices where the melt flows over the refractory surface. The attack is also especially pronounced at the surface of the melt where the three phases, molten glass, solid refractory and air, meet. To overcome this difficulty, it is common practice to provide the refractory material where it is exposed in use to molten glass, with a coating of platinum or of a platinum-rhodium alloy in the form of a thin sheet fitting closely to the surface.

This method, however, is subject to disadvantages. The surfaces which can be protected are limited to those having simple shapes into which the metal or alloy sheet can be formed. It is difficult to support the metal sheet in position on the refractory base and the mechanical stresses caused by the molten glass at the high temperatures used strain the sheet at the points where it is supported and lead to deformation by creep and to ultimate failure. Also, the sheet must extend over a larger area than is actually exposed to the glass, since if the edge of the sheet is submerged below the surface, the molten glass works beneath the sheet, attacks the refractory and forces the sheet away from the surface of the refractory and no way has been found of effectively preventing this. Further, a large amount of capital is locked up in the considerable weights of precious metals used for the sheathing.

A further method is known to reside in the teaching of Kettel et al. in United Kingdom patent specification No. 117,432 where the article is covered with a solution of emulsion of platinum chloride, glycerol and phenylhydrazine and heated to reduce the platinum to a metallic state. We have found, however, that this method is unsatisfactory when applied to porous surfaces in that the weak concentration of the platinum solution is such that on subsequent firing too little platinum is deposited in the interstices. To form a keyed coating of platinum, hundreds of applications of the above technique would be needed to build up a continuous film; this is tedious and most uneconomic.

Although many attempts were made to overcome the foregoing difficulties and other disadvantages, none, as far as we are aware, was entirely successful when carried into practice commercially on an industrial scale.

It has now been discovered that by the use of a special composite structure the aforementioned difficulties may be avoided.

It is an object of the present invention to provide a novel composite structure for use in contact with molten glass.

Another object of the invention is to provide a process for producing a novel structure for use in contact with molten glass, other molten vitreous materials, molten metals or corrosive fluid media.

The invention also contemplates providing a novel metallizing liquid for use in the process of producing the novel composite structure.

It is a further object of the invention to provide a process for producing said novel metallizing liquid.

Other objects and advantages will become apparent from the following description taken in conjunction with the accompanying drawing in which is shown a cross section of metal-refractory composite as contemplated in accordance with the present invention.

Generally speaking, the present invention contemplates a composite metal refractory (or metal-ceramic) article, wherein the whole or part of the surface of a porous refractory that may be exposed in use to the deleterious action of molten glass, molten vitreous material or corrosive fluid media is or are protected by metal of the platinum group keyed to the refractory surface. This metal is partly in the form of a coating around the refractory grains at and close to the coated refractory surface and partly in the form of a continuous metallic layer over the coated grains and integral with their coatings. It is to be noted that in the present specification and claims, the term "key" or "keying" is used with reference to the zone immediately below the refractory metal interface, wherein the ceramic particles are at least partially enclosed by or coated with platinum group metal integral with the metal surfaces.

The invention also includes a process of forming coatings of a metal of the platinum group keyed to the surface of the refractory material by successive applications of a liquid platinum preparation containing at least 150 grams of the metal per liter, prepared by dissolving a simple or complex halogen acid of the metal or reacting such a halogen acid of the metal with an oxygenated organic liquid such as di-iso-propyl ether; di-ethyl ether; di-n-butyl ether; methyl-iso-butyl ketone or acetone, the coated surface being heated after each application for about 2 to 15 minutes at temperatures of about 400° C. to about 1000° C. to decompose the coating to metal.

It must be observed, however, that if acetone is used with the halogen acid of platinum, the resultant solution is not stable, it throws down a tarry solid of low platinum content and is wholly unsuitable for the purpose of this invention. To overcome this disadvantage, the solution would need to be freshly made and applied without undue delay. The solution may, as is well known, be stabilized by the addition of alcohol at levels above 20% when the film forming properties of the solution are impaired; the optimum alcohol level we have found to be about 10% for coating purposes.

The metal-bearing liquid advantageously is sufficiently viscous, for example, having a viscosity above 2 centistokes at 20° C. to prevent it soaking more than a few millimeters into the refractory, though the penetration should be deep enough (at least 2 microns), and this will naturally depend on the refractory surface to enable a key to be formed between the refractory or ceramic body and the metal coating.

As was mentioned above, in making the liquid to be used in metallizing (applying coating of the platinum group metal to the refractory), the major considerations involved are metal content and viscosity of the liquid. Advantageously, the liquid should also have a relatively low surface tension with respect to common porous refractories so that controlled penetration of the refractory pores is insured.

The viscosity is proportional to the metal content and the more viscous solutions are used with coarse-grained ceramic surfaces and vice versa.

As already pointed out, stability of the metallizing liquid (the vehicle) in order to assure satisfactory shelf life is quite important. It has been found most advantageous from the standpoint of stability and metal concentration to use di-iso-propyl ether when forming the said metallizing liquid from the halogen acid of platinum.

Generally speaking, in order to form the vehicle, a halogen acid of the metal such as chloroplatinic acid is subjected to the action of the aforementioned organic liquids. Advantageously, the organic complex is continuously removed from the reaction medium.

In the case where the vehicle is formed using a halogen acid of the metals ruthenium or rhodium, these may be subjected to the action of acetone or methyl-iso-butyl ketone but in such instances the removal of the product from the reaction medium is unnecessary. The halogen acid of the metals ruthenium or rhodium will not work with the ethers.

It may be advantageous to subject the product to further heating at temperatures of about 100° C. in order to concentrate and/or chemically change the product. The product may be used to metallize many porous ceramic refractories including alumina, fire clay, high alumina fire clay, sillimanite, graphite, zircon, Molochite, mullite, Monofrax, Zac and Corhart.

The composite metal-ceramic structure which is contemplated in the present invention is shown diagrammatically in enlarged cross section in the drawing. Referring now thereto, refractory material 11 has a molten glass contacting surface 12 which is the outer surface of platinum group metal layer 13. The zone intermediate base refractory material 11 and platinum group metal layer 13 lying substantially between lines A—A and B—B is substantially comprised of refractory particles 14 at least partially surrounded by platinum group metal 15 which is integral with the metal of layer 13.

In carrying the invention into practice, advantageous results are obtained when platinum is used as the metal in the metal-refractory composite of the present invention. Very useful platinum coating liquids may be made by subjecting chloroplatinic acid to the action of di-iso-propyl ether.

With regard to the structure of these liquids, a number of representative analyses was performed on samples extracted at each preparative stage and we conclude from this that the liquid is probably a complex of the following composition initially:

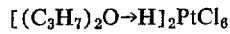

$$[(C_3H_7)_2O \rightarrow H]_2PtCl_6$$

This liquid bis-di-iso-propyl ether chloroplatinic acid is then concentrated on a water bath with the evolution of HCl and ether yielding a complex of the following composition:

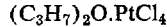

$$(C_3H_7)_2O \cdot PtCl_4$$

This complex which together with colloidal platinum may be regarded as the structure of the ultimate coating liquid is di-iso-propyl ether platinous chloride. Platinum coating liquids made with di-iso-propyl ether are very stable and may contain from about 600 to about 1300 g.p.l. of platinum in liquid phase. When making these useful platinum-containing coating liquids the initial product is a liquid containing about 600 g.p.l. of platinum which is insoluble in excess di-iso-propyl ether. To further concentrate the chloroplatinic acid subjected to the action of di-iso-propyl ether, it must contain at least a small amount of nitric acid, the liquid then may upon heating on a water bath, be further concentrated so that it contains up to 1300 g.p.l. of platinum. Upon initially reaching this concentration the liquid is mobile. Further heating results in thickening the liquid up to a paste-like consistency. A liquid composition containing about 1250 g.p.l. of platinum contains about 50% platinum by weight in liquid phase and has a specific gravity of about 2.5. The viscosity of the liquids having this very high platinum content may be varied from 80 centistokes to infinity at 20° C. by controlling the amount of heating to which the liquid is subjected. The high platinum content of at least about 600 grams per liter of the di-iso-propyl ether liquids and their controllable viscosity render them particularly suitable for the production of a continuous keyed coating of platinum upon refractory materials of widely varying porosities.

As stated, the use of a high viscosity liquid prevents the liquid from soaking too far into the more porous refractory materials and lower viscosity liquids permit the formation of close, continuous metal films on the denser, less porous refractories used for some purposes. These liquids have the further advantage that they can be decomposed to continuous metallic platinum by heating at a moderate heat, e.g., about 400° C. or above.

To produce a coating of metal on the surface of a refractory material, a liquid containing at least 150 g.p.l. of platinum group metal in liquid phase, is painted onto the surface, dried and fired by heating to a red heat, e.g., about 600° C. in the flame of an air-gas blow torch or in a furnace. The refractory is allowed to cool and further layers are applied in the same way.

Two or three applications of liquid containing at least 600 g.p.l. of platinum give a very thin, electrically conductive, porous superficial layer of platinum. Further applications eventually result in a layer of refractory grains some 1-2 mm. thick, adjacent to the surface being coated with platinum metal, while on top there is a continuous superficial layer of platinum up to about 0.25 mm. thick. The number of applications needed to bring about this result varies with the porosity of the refractory and with the concentration and viscosity of the solution of platinum used.

The coating of the sub-surface grains is continuous or integral with the superficial platinum layer and keys it firmly to the refractory surface, so that it will not peel or flake off.

Once a basic layer has been formed in this way, it may be built up by deposition of further amounts of metals in various ways, for example, by electrodepositions, by chemical reduction from solution, or by spraying. Advantageously, the metal may also be consolidated by mechanical treatment such as burnishing.

Thicker coatings may also be produced by suspending flake platinum powder or platinum black in the platinum solutions or other suitable media. The invention is not limited to the production of coatings of platinum. Thus, solutions of other platinum metal halogen acids such as ruthenium or rhodium or suspensions of these metals in organic solvents may be used in similar ways to platinum. Further, alloy coatings can be deposited by using mixed solutions or by depositing alternate layers of different metals followed by diffusion by heating.

For the purpose of giving those skilled in the art a better understanding of the invention and/or a better appreciation of the advantages of the invention, the following illustrative examples are given:

*Example I*

To prepare a most advantageous platinum coating liquid which has remarkable stability, which is believed to be novel and which also forms part of our invention, platinum is first dissolved in aqua regia to form chloroplatinic acid solutions. The solution containing residual amounts of nitric acid is evaporated to a syrup, which crystallizes on cooling. The crystalline mass of chloroplatinic acid thus produced, is treated with di-iso-propyl ether at temperatures from about 20° C. to about 40° C. to form a dark brown liquid containing approximately 600 grams per liter (g.p.l.) of platinum. This liquid is insoluble in di-iso-propyl ether, but has itself a slight solubility for the ether. Chloroplatinic acid is not soluble in the brown liquid and unless the liquid is continuously removed, the reaction ceases, the platinum salt becoming coated with the reaction product. This difficulty is avoided, for example, by performing the reaction in a coarse sintered glass Buchner funnel, from which the platinum-bearing liquid runs off as it is formed. To ensure complete reaction of all the platinum salt, excess di-isopropyl ether is used and the platinum bearing liquid is removed from the excess ether by means of a separating funnel.

*Example II*

The platinum-bearing liquid as produced in Example I may be used to form platinum coatings, but preferably it is first concentrated and subsequently chemically changed before use by heating on a water bath. Dissolved ether first evaporates off, then the liquid effervesces, fumes are evolved, it becomes much darker and there finally results a black, mobile liquid having a specific gravity of about 2.5 and a platinum content of about 1250 g.p.l. (about 50% platinum by weight). Further heating on the water bath results in thickening of the liquid to a paste, but without further increase in density or platinum content.

*Example III*

Platinum was dissolved in aqua regia to form a solution of chloroplatinic acid. The solution was evaporated to dryness and residual nitric acid was removed therefrom by repeatedly taking up the crystalline material with hydrochloric acid and redrying. The purified chloroplatinic acid was then subjected to the action of di-iso-propyl ether. A brown liquid similar to the brown liquid produced in Example I was formed. This liquid contained about 600 g.p.l. of platinum.

*Example IV*

Blocks of absorbent fire clay of high alumina content, which have been ground to provide a smooth surface, were platinized with successive layers of a 600 gram per liter platinum liquid prepared as described in Example III from the action of di-iso-propyl ether on nitric acid-free chloroplatinic acid syrup. The blocks were fired after each application by heating to redness in the flame of a gas-air blow torch.

In one instance, a block 2 cm. square was found to have absorbed 0.2 gm. of platinum after six applications. The platinum had penetrated to a depth of 3 mm. The coating had a metallic apearance and electrical continuity but on heating at 1200° C. in air breakdown of the continuity of the metal film occured after 100 hours.

In a second instance, a similar block absorbed 0.38 gm. of platinum after 23 applications with a penetration of about 1 mm. The coating had a bright metallic appearance. One-half of the surface was burnished and the other left unchanged. The thickness of the superficial layer on the burnished part was then found to be 0.008 to 0.025 mm. and on the unburnished part 0.01 to 0.033 mm. After heating at 1200° C. in air for 630 hours, the surface of both portions of the block was thermally etched but still unbroken and electrically conducting.

In a third instance in which 40 applications of the same solution were made, penetration took place to a depth of 1.5 mm. and the surface layer (unburnished) was 0.038 mm. thick.

Part of this specimen was immersed in molten glass at a temperature of 1200° C. for one week. At the end of this time, the metal film was unbroken and the refractory under it undamaged, whereas unprotected parts of the refractory showed evidence of considerable attack by the molten glass.

*Example V*

A solution containing 1280 grams of platinum per liter as made in Example II was applied to the surface of a specimen of coarse-grained sillimanite which had been ground to remove the surface layers. The specimen was examined after 10, 20 and 30 applications of the platinum solution. After 10 coats the metal had penetrated 1½ mm. and formed a continuous superficial layer of an average thickness of about 0.008 mm., after 20 coats the superficial metal film averaged 0.025 mm. in thickness. After 30 coats the penetration of metal into the refractory surface was 2 mm. and the average superficial metal film was 0.08 mm. in thickness. The metal had tended to smooth off the refractory surface filling original pits in it with solid metal up to 0.4 mm. in thickness.

*Example VI*

A di-ethyl ether liquid complex with chloroplatinic acid is formed in the same way as with di-iso-propyl ether. The platinum containing liquid, although quite stable, only contains about 200 gm. of platinum per liter. The liquid gives a poor film and unless very carefully fired, forms a heavy deposit of carbon. To obtain this liquid, chloroplatinic acid was subjected to the action of di-ethyl ether at 20° C. and the product separated therefrom. A sample of fire clay was coated with the liquid and was fired at a temperature of about 700° C.

*Example VII*

Acetone dissolves chloroplatinic acid to form a single phase solution containing up to about 800 grams of platinum per liter. These solutions, when fresh, yield good coatings on high quality fire clay with the use of the techniques of Example VI mutatis mutandis.

*Example VIII*

A liquid containing approximately 215 grams of rhodium per liter was prepared by subjecting rhodium chloride to the action of acetone at 20° C. Twenty-three applications of this solution to a high alumina fire clay specimen of 4 sq. cm. area deposited 0.17 gram of metal, giving a film with a superficial thickness of from 0.005 mm. to 0.025 mm. and a penetration into the refractory surface of about 1 mm. This film also withstood heating in air for 630 hours at 1200° C.

*Example IX*

Using the rhodium solution as prepared in Example VIII mixed with the appropriate quantity of a solution of platinum in di-iso-propyl ether containing 600 grams of platinum per liter, as prepared in Example I, such that the mixture contains equal quantities of platinum and rhodium, an alloy film containing 50% each of rhodium and platinum was deposited on another refractory specimen. 0.14 gram of the alloy were deposited in six applications on a surface of area 4 sq. cm.

*Example X*

A layer of ruthenium was applied to a refractory surface by means of a solution containing about 155 grams of ruthenium per liter prepared by dissolving ruthenium chloride in acetone. This ruthenium coating was used as an undercoat to subsequent platinum coatings applied via a di-iso-propyl ether solution.

*Example XI*

To obtain the iodo-analogue of chloroplatinic acid, platinic iodide was dissolved in hydroiodic acid and the solution evaporated to low bulk to yield iodo-platinic acid, which crystalizes on cooling. Di-iso-propyl ether was added to the crystalline mass to form a dark brown liquid which was used to coat the surface of a high quality fire clay. The refractory was subsequently fired at 700° C. to form a platinum mirror on the porous surface.

*Example XII*

The efficacy of the invention is shown by the following comparative stirring test in molten glass.

A rod of slip cast zircon refractory approximately 1.8 cms. square and 8 cms. in length and with about 26% porosity was platinum coated by 40 applications of platinum solution (isopropyl-ether base) with intermediate firings at an approximate temperature of 700° C. The initial key into the refractory surface was established by the use of a low viscosity solution containing 35% platinum. Subsequently, the film was built up by the application of solutions containing up to 50% platinum.

The final average superficial platinum thickness was of the order 0.025 mm. and sub-surface penetration was from 1.0 to 1.5 mm.

The coated test piece together with a similar uncoated test piece were subject to test by suspending from a refractory jig in molten soda glass at a temperature of 1450° C., the whole assembly being rotated. The test was continued for 15¼ hours making 12,810 revolutions. At the termination of the test the test pieces were allowed to drain of glass and then removed for examination. The platinum coated test piece remained unattacked by the glass but the uncoated test piece had 35% of its sectional area eroded by the molten glass.

It is to be noted that if the product of the reaction of di-iso-propyl ether and purified nitric acid-free chloroplatinic acid as described in Example III is subjected to further heating beyond that required to remove dissolved ether the material decomposes to form di-iso-propyl ether and a brown solid containing about 75% platinum and about 8% chlorine by weight. This brown solid may be added to the platinum solution to enrich its platinum content.

The present invention is particularly applicable to the production of glass working equipment such as melting pots, ladles, stirring rods, molds, mandrels, orifices, gates, electrodes, floats, thermocouples, sheaths and weirs. In addition, the present invention may be used to produce composite structural units such as bricks, tiles, etc., which may be used to make up such items as mentioned above. Further, the present invention may be used to produce composite structural units for atomic energy applications where the structures may be used in corrosive media such as inter alia molten bismuth.

The present application is a division of our copending U.S. patent application Serial No. 716,402, filed on February 20, 1958.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A method for the production of stable metallizing vehicles which comprises interacting a solid compound from the group consisting of platinum group metal halides and halo acids with at least an equal weight of a liquid selected from the group consisting of di-iso-propyl ether, di-n-butyl ether, methyl-iso-butyl ketone, ethyl ether and acetone at room temperature to about 40° C. whereby a liquid metallizing vehicle is produced.

2. A method for the production of stable metallizing vehicles which comprises interacting a solid compound from the group consisting of platinum group metal halides and halo acids with at least an equal weight of liquid selected from the group consisting of di-iso-propyl ether, di-n-butyl ether, methyl-iso-butyl ketone and ethyl ether at room temperature to about 40° C. under atmospheric pressure while continuously removing the product from the reaction media and thereafter subjecting the product obtained thereby to thermal action at a temperature of about 100° C. whereby a viscous liquid metallizing vehicle is produced.

3. A method for the production of a stable platinizing vehicle which comprises interacting solid chloroplatinic acid with at least an equal weight of liquid selected from the group consisting of di-iso-propyl ether, di-n-butyl ether, methyl-iso-butyl ketone and ethyl ether at room temperature to about 40° C. under atmospheric pressure while continuously removing the product from the reaction media whereby a liquid metallizing vehicle is produced.

4. A method for the production of stable metallizing vehicles which comprises interacting solid chloroplatinic acid with at least an equal weight of di-iso-propyl ether at room temperature to about 40° C. under atmospheric pressure while continuously removing the product from the reaction media whereby a stable platinizing liquid is produced.

5. A method for the production of stable metallizing vehicles which comprises interacting solid chloroplatinic acid with at least an equal weight of di-iso-propyl ether at room temperature to about 40° C. under atmospheric pressure while continuously removing the product from the reaction media and thereafter subjecting the product thus obtained to thermal action at a temperature of 100° C. to concentrate said product with respect to platinum and increase the viscosity thereof whereby a stable platinizing liquid vehicle is produced.

6. A stable, single-phase platinizing vehicle, liquid at ordinary room temperatures, containing at least 150 grams per liter of platinum made by reacting chloroplatinic acid with at least an equal weight of di-iso-propyl ether at room temperature to about 40° C.

7. A stable, single-phase platinizing vehicle, liquid at ordinary room temperatures, containing at least 150 grams per liter of platinum and made by reacting chloroplatinic acid with at least an equal weight of di-iso-propyl ether at room temperature to about 40° C. in the presence of free nitric acid and thereafter subjecting the product obtained thereby to a temperature of about 100° C. under atmospheric pressure for about 4 hours to provide a liquid platininzing vehicle having a viscosity up to 200 centistokes at 20° C.

8. A platinum-containing material having about 8% chlorine and 75% platinum made by subjecting nitrogen-free chloroplatinic acid to the action of at least an equal weight of di-iso-propyl ether and decomposing at a temperature of about 100° C.

References Cited in the file of this patent

UNITED STATES PATENTS

| | | |
|---|---|---|
| 2,166,076 | Rosenblatt | July 11, 1939 |
| 2,328,101 | Rosenblatt | Aug. 31, 1943 |

UNITED STATES PATENT OFFICE
CERTIFICATE OF CORRECTION

Patent No. 3,083,109                                  March 26, 1963

Edwin Clements Rhodes et al.

It is hereby certified that error appears in the above numbered patent requiring correction and that the said Letters Patent should read as corrected below.

Column 3, line 22, for "mullite" read -- Mullite --; column 5, line 42, for "apeparance" read -- appearance --; column 6, line 59, for "crystalizes" read -- crystallizes --; line 72, for "(isopropyl-ether base) read -- (iso-propyl-ether base) --; column 8, line 47, for "platininzing" read -- platinizing --.

Signed and sealed this 11th day of February 1964.

(SEAL)
Attest:

ERNEST W. SWIDER
Attesting Officer

EDWIN L. REYNOLDS

Acting Commissioner of Patents